(12) United States Patent
Jin

(10) Patent No.: US 9,917,541 B2
(45) Date of Patent: Mar. 13, 2018

(54) DEVICE AND METHOD FOR DRIVING MOTOR

(71) Applicant: Mando Corporation, Pyeongtaek-si, Gyeonggi-do (KR)

(72) Inventor: Jong Hak Jin, Hwaseong-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 16 days.

(21) Appl. No.: 15/242,587

(22) Filed: Aug. 21, 2016

(65) Prior Publication Data
US 2017/0054405 A1  Feb. 23, 2017

(30) Foreign Application Priority Data
Aug. 21, 2015 (KR) .......................... 10-2015-0117622

(51) Int. Cl.
H02P 1/00       (2006.01)
H02P 7/03       (2016.01)
H02P 29/024     (2016.01)

(52) U.S. Cl.
CPC .............. *H02P 7/04* (2016.02); *H02P 29/024* (2013.01)

(58) Field of Classification Search
CPC ................................................... H02P 29/027
USPC .................................................... 318/445, 34
See application file for complete search history.

(56) References Cited

U.S. PATENT DOCUMENTS 5,729,067 A * 3/1998 Janutka ................ G05B 19/351
310/12.04

FOREIGN PATENT DOCUMENTS

KR  20090007236 A  1/2009
KR  20140002940 A  1/2014

OTHER PUBLICATIONS

Korean Office Action dated Aug. 1, 2016 corresponding to Korean Application No. 10-2015-0117622.

* cited by examiner

*Primary Examiner* — David S Luo
(74) *Attorney, Agent, or Firm* — Hauptman Ham, LLP

(57) ABSTRACT

The present disclosure relates a motor driving device that includes: an H-bridge circuit that includes first and second legs, each of which has one pair of switches, and supplies a driving current to a motor; a current sensor disposed between the H-bridge circuit and a voltage source; and a controller that acquires a first sensing signal from the current sensor for a first period of time during which a turn-on signal is supplied to a first switch disposed in the first leg or a fourth switch disposed in the second leg, to acquire a second sensing signal from the current sensor for a second period of time during which a turn-on signal is supplied to a second switch disposed in the first leg or a third switch disposed in the second leg, and determines an abnormality in the H-bridge circuit.

12 Claims, 7 Drawing Sheets

DEVICE AND METHOD FOR DRIVING MOTOR

CROSS REFERENCE TO RELATED APPLICATION

This application claims priority from Korean Patent Application No. 10-2015-0117622, filed on Aug. 21, 2015, which is hereby incorporated by reference for all purposes as if fully set forth herein.

BACKGROUND OF THE INVENTION

1. Field of the Invention

The present invention relates to a technology of driving a motor. More specifically, the present invention relates to a technology of determining whether there is an abnormality in a motor driving circuit and performing a safety algorithm.

2. Description of the Prior Art

A steering system refers to an apparatus that controls the progress direction of a vehicle according to a driver's steering. The steering system includes a steering wheel directly operated by the driver and a steering device that transmits the steering force of the steering wheel to the vehicle's wheels. Furthermore, a recent steering system further includes auxiliary power steering apparatuses for providing the convenience of driving by assisting with the force by which the driver operates the steering wheel.

The auxiliary power steering apparatuses assist the force transmitted to the vehicle's wheels by generating a motor torque that is proportional to the force by which the driver operates the steering wheel, which enables the driver to easily operate the vehicle's wheels using the assistance of the motor torque.

The auxiliary power steering apparatus includes a motor driving device for generating the above-described motor torque. If the motor driving device normally operates, the motor is capable of being controlled to generate a motor torque proportional to the force by which the driver operates the steering wheel as described above. In contrast, if the motor driving device abnormally operates, the motor driving device itself is likely to be damaged, and may abnormally operate the motor to cause the steering control to be abnormally performed, or to cause the steering system to enter a locked state.

SUMMARY OF THE INVENTION

In this background, an aspect of the present invention is to provide a technology of determining whether there is an abnormality in a motor driving device. Another aspect of the present invention is to provide a technology of performing a safety algorithm according to an abnormal operation of a motor driving device.

In accordance with an aspect of the present invention, there is provided a motor driving device. The motor driving device includes: an H-bridge circuit that includes first and second legs, each of which has one pair of switches disposed therein and connected with each other in series, and is configured to supply a driving current to a motor; a current sensor disposed between the H-bridge circuit and a voltage source; and a controller configured to acquire a first sensing signal from the current sensor for a first period of time during which a turn-on signal is supplied to the first switch disposed in the first leg or the fourth switch disposed in the second leg, to acquire a second sensing signal from the current sensor for a second period of time during which a turn-on signal is supplied to the second switch disposed in the first leg or the third switch disposed in the second leg, and to determine whether there is an abnormality in the H-bridge circuit according to the characteristic of at least one of the first and second sensing signals.

In accordance with another aspect of the present invention, there is provided a method for driving a motor using an H-bridge circuit. The method includes: a gate driving step of supplying turn-on gate signals to a first switch disposed in a first leg of the H-bridge circuit and a fourth switch disposed in a second leg for a first period of time and supplying turn-on gate signals to a second switch disposed in the first leg and a third switch disposed in the second leg for a second period of time; a current sensing step of sampling the sensing voltage formed in a shunt resistor disposed between the H-bridge circuit and a voltage source one or more times for the first period of time and for the second period of time; a normality determination step of determining whether there is an abnormality in the H-bridge circuit according to the characteristic of at least one of a first sensing signal sampled for the first period of time and a second sensing signal sampled for the second period of time; and a fail safety step of supplying gate signals according to the fail safety algorithm to the respective switches when it is determined that there is an abnormality in the H-bridge circuit.

As described above, according to the present invention, it is possible to determine whether there is an abnormality in the motor driving device and to perform a safety algorithm according to the determination result.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Figure 1A:
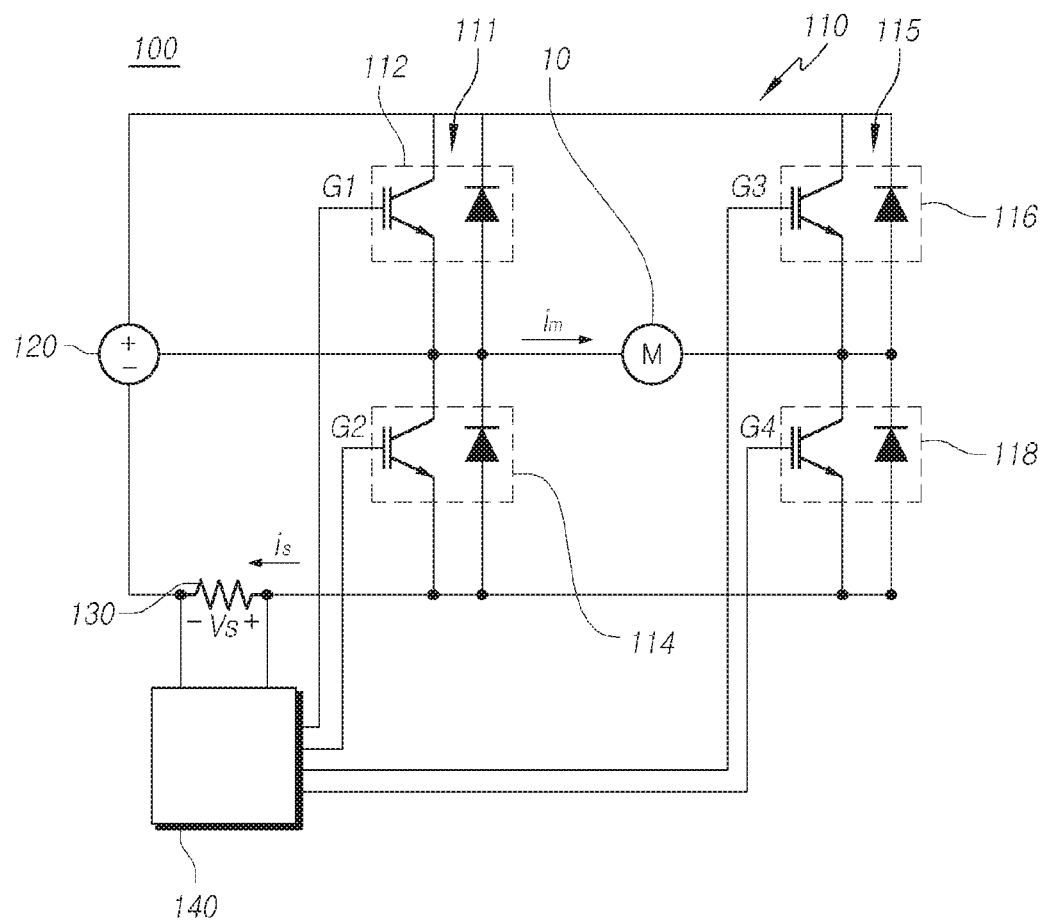
FIG. 1A illustrates the configuration of a motor driving device according to one embodiment.

Hereinafter, embodiments of the present invention will be described in detail with reference to the accompanying drawings. In adding reference numerals to elements in each drawing, the same elements will be designated by the same reference numerals, if possible, although they are shown in different drawings. Further, in the following description of the present invention, a detailed description of known functions and configurations incorporated herein will be omitted when it is determined that the description may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1A illustrates the configuration of a motor driving device according to one embodiment.

Referring to FIG. 1A, the driving device 100 may include an H-bridge circuit 110, a voltage source 120, a current sensor 130, and a controller 140.

The H-bridge circuit 110 may include a first leg 111 and a second leg 115. A first switch 112 and a second switch 114, which are connected with each other in series, may be disposed in the first leg 111. Further, a third switch 116 and a fourth switch 118, which are connected with each other in series, may be disposed in the second leg 115.

The switches 112, 114, 116, and 118 may include power semiconductors, respectively, which may be subject to a turn-on control. For example, the switches 112, 114, 116, and 118 may include Field Effect Transistors (FETs), Insulated Gate Bipolar mode Transistors (IGBTs), etc. The switches 112, 114, 116, and 118 may include diodes that are connected to the power semiconductors in parallel for allowing reverse currents.

The driving current $i_m$ generated by the H-bridge circuit 110 may be supplied to a motor 10, one side of which is connected to a node where the first and second switches 112 and 114 join and the other side of which is connected a node where the third and fourth switches 116 and 118 join.

The current sensor 130 may be disposed between the H-bridge circuit 110 and the voltage source 120. The current sensor 130 may be of a Hall sensor type or a resistive type. A high-precision resistor, which is called a shunt resistor, may be used as the current sensor 130.

The current sensor 130 may be connected with the positive or negative electrode of the voltage source 120. The negative electrode of the voltage source 120 may be connected with the ground, in which case the current sensor 130 may also be connected with the ground.

The controller 140 may acquire a sensing signal from the current sensor 130 and may control the H-bridge circuit 110 using the sensing signal. A sensing voltage $V_s$ corresponding to a sensing current $i_s$ may be formed in the current sensor 130, and the controller 140 may estimate or compute the sensing current $i_s$ according to the sensing voltage $V_s$.

The controller 140 may turn on or off the switches 112, 114, 116, and 118 that are disposed in the H-bridge circuit 110. In order to control the switches 112, 114, 116, and 118, the controller 140 may generate gate signals G1, G2, G3, and G4 and may transmit the gate signals G1, G2, G3, and G4 to the switches 112, 114, 116, and 118.

The switches 112, 114, 116, and 118 may be turned on or off according to the gate signals G1, G2, G3, and G4 generated by the controller 140. Further, the driving current $i_m$ flowing toward the motor 10 may be generated according to the turn-on or turn-off of the switches 112, 114, 116, and 118.

Figure 1B:
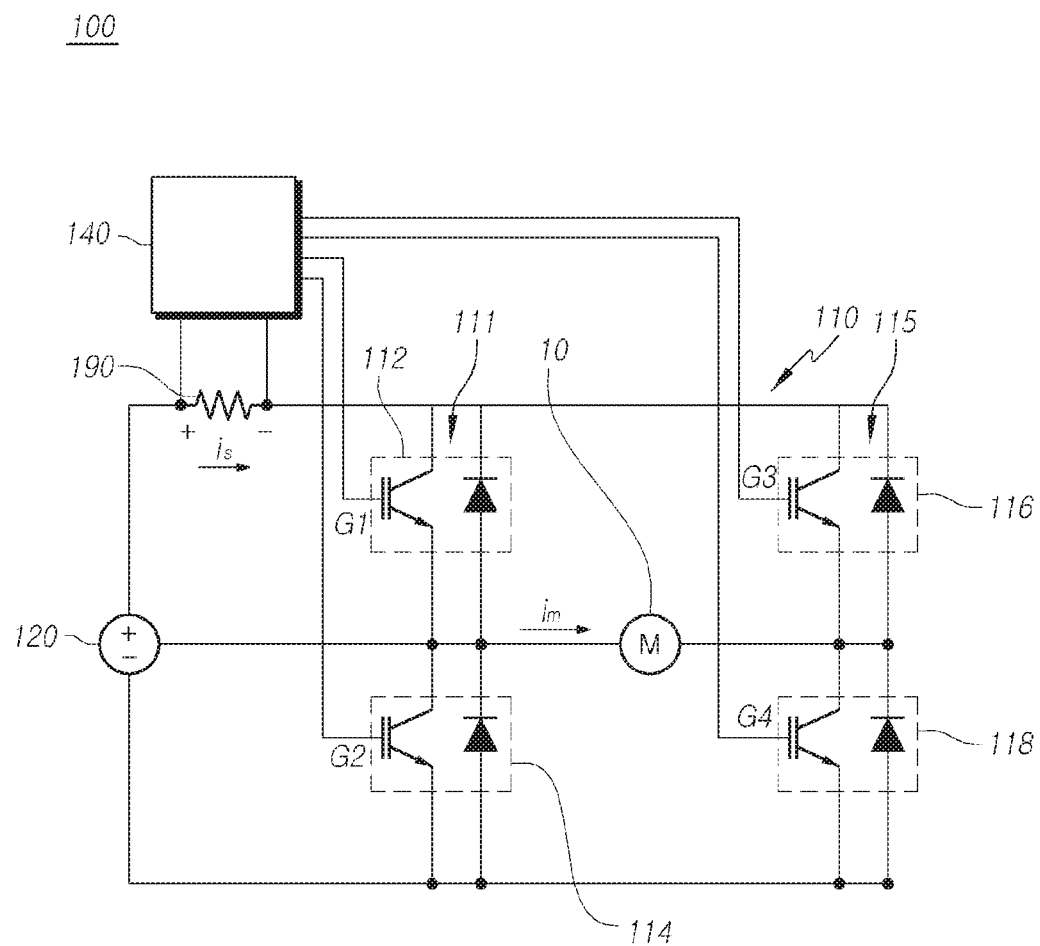
FIG. 1B illustrates the configuration of a motor driving device according to another embodiment.

FIG. 1B illustrates the configuration of a motor driving device according to another embodiment.

Referring to FIG. 1B, the driving device (100) may include an H-bridge circuit 110, a voltage source 120, a current sensor 190, and a controller 140. The current sensor 190 in FIG. 1B may be disposed between the H-bridge circuit 110 and the voltage source 120, but may be connected with the voltage source 120 at the positive electrode thereof and the H-bridge circuit 110 at the negative electrode thereof, as opposed to the current sensor 130 in FIG. 1A. Namely, the current sensor 190 may be connected between the voltage source 120 and first and third switches 112 and 116 of the H-bridge circuit 110. Meanwhile, in this case, the polarity of a current sensed by the current sensor may be opposite to that in FIG. 1A.

Hereinafter, for the convenience of description, it is assumed that the current sensor 130 is connected as illustrated in FIG. 1A. However, the concepts of the embodiments of the present invention may also be identically applied to the case where the current sensor 190 is connected as illustrated in FIG. 1B, which may fall within the spirit and scope of the present invention.

Figure 2:
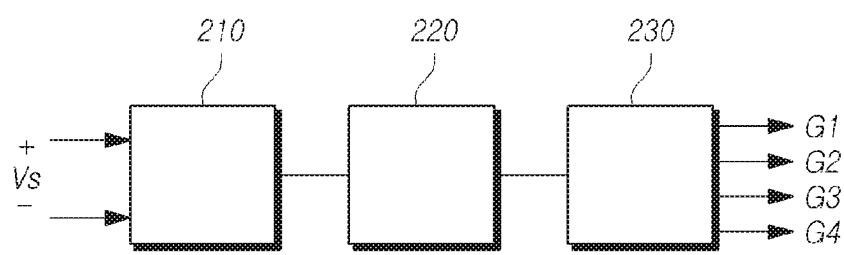
FIG. 2 is a block diagram of the controller of FIG. 1A.

FIG. 2 is a block diagram of the controller of FIG. 1A.

Referring to FIG. 2, the controller 140 may include a sensing block 210, an analysis block 220, and a gate driving block 230.

The sensing block 210 may estimate or compute the sensing current $i_s$ using the sensing voltage $V_s$ input from the current sensor 130. The analysis block 220 may determine whether there is an abnormality in the H-bridge circuit 110 using the acquired sensing current $i_s$. The gate driving block 230 may generate gate signals G1, G2, G3, and G4 for controlling the turn-on or turn-off of the switches 112, 114, 116, and 118 and may control the switches 112, 114, 116, and 118 of the H-bridge circuit 110 according to the analysis result of the analysis block 220.

The sensing block 210 may include a sample & hold circuit and may estimate or compute the sensing current $i_s$ by processing a sensing signal received from the current sensor 130 at every specific time point. The switches 112, 114, 116, and 118 may be repeatedly turned on or off according to a Pulse Width Modulation (PWM) period (see T of FIG. 3), and the sensing block 210 may process the sensing signal in response to the PWM period (see T of FIG. 3).

The gate driving block 230 may include a gate driving circuit for generating the gate signals G1, G2, G3, and G4. Furthermore, the gate driving block 230 may further include a circuit for sensing the states of the switches 112, 114, 116, and 118. For example, the gate driving block 230 may further include a circuit for sensing a drain-source voltage. The sensed state values of the switches 112, 114, 116, and 118 may be transferred to the analysis block 220.

The analysis block 220 may determine whether there is an abnormality in the H-bridge circuit 110 according to the sensing signal received from the sensing block 210.

Furthermore, according to embodiments, the analysis block 230 may determine whether there is an abnormality in the H-bridge circuit 110 according to the signal received from the gate driving block 230. For example, the gate driving block 230 may sense the states of the switches 112, 114, 116, and 118, and the analysis block 220 may determine whether there is an abnormality in the H-bridge circuit 110 based on these state values. By way of specific example, the gate driving block 230 may sense the drain-source voltages of the switches 112, 114, 116, and 118, and the analysis block 220 may determine whether the switches 112, 114, 116, and 118 stop working properly on the basis of the drain-source voltages. When turn-on gate signals are transferred to the switches 112, 114, 116, and 118, the drain-source voltages have to be low voltages close to 0 V, and when turn-off gate signals are transferred to the switches 112, 114, 116, and 118, the drain-source voltages have to be high voltages. The analysis block 220 may determine that there is a failure in the switches 112, 114, 116, and 118 when the drain-source voltages do not match the gate signals G1, G2, G3, and G4.

Meanwhile, the analysis block 220 may determine whether there is an abnormality in the H-bridge circuit 110 by analyzing the characteristic of the sensing signal received from the sensing block 210. When the H-bridge circuit 110 abnormally operates, the characteristic of the sensing signal received from the sensing block 210 may vary, compared with when the H-bridge circuit 110 normally operates, and the analysis block 220 may determine whether there is an abnormality in the H-bridge circuit 110 by analyzing the characteristic of the sensing signal.

Figure 3:
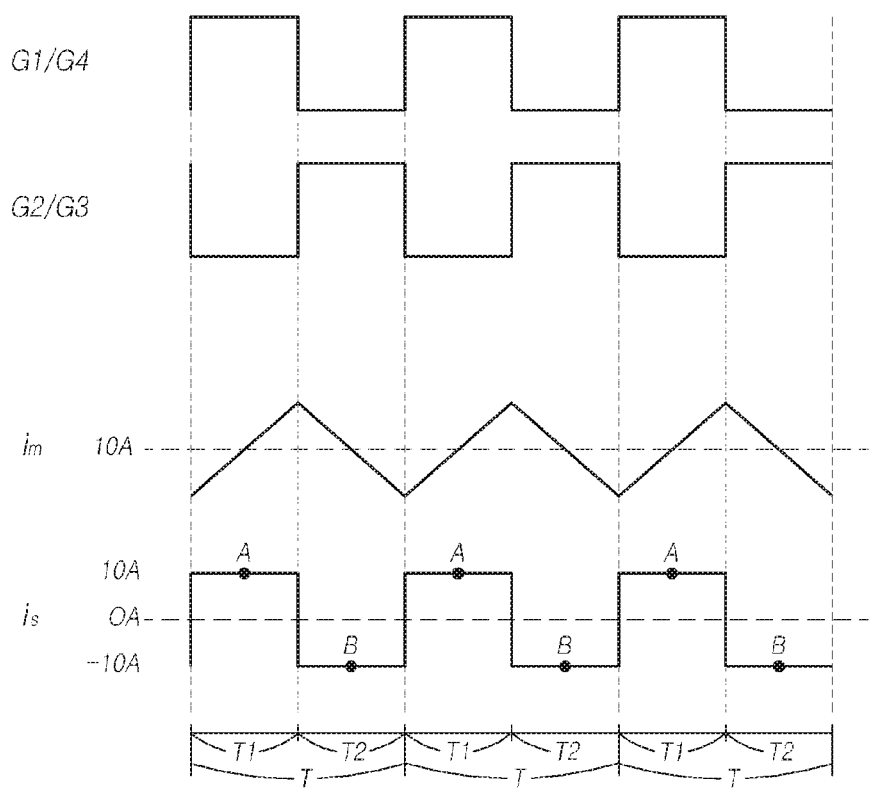
FIG. 3 illustrates waveforms generated in the driving device in a normal operating state.

FIG. 3 illustrates waveforms generated in the driving device in a normal operating state.

Referring to FIG. 3, the gate signals G1, G2, G3, and G4 have a logic high value and a logic low value that are repeated according to a predetermined Pulse Width Modulation (PWM) period T. In this case, the switches 112, 114, 116, and 118 may be turned on when the gate signals G1, G2, G3, and G4 supplied thereto have a logic high value and may be turned off when the gate signals G1, G2, G3, and G4 supplied thereto have a logic low value.

The first gate signal G1 supplied to the first switch 112 and the fourth gate signal G4 supplied to the fourth switch 118 may be synchronized with each other. Furthermore, the second gate signal G2 supplied to the second switch 114 and the third gate signal G3 supplied to the third switch 116 may be synchronized with each other.

The PWM period T may be divided into a first period T1 and a second period T2. Turn-on gate signals may be supplied to the first and fourth switches 112 and 118 for the first period of time T1, and turn-on gate signals may be supplied to the second and third switches 114 and 116 for the second period of time T2.

In this case, the driving current $i_m$ flowing toward the motor 10 may repeatedly increase and decrease with respect to a specific magnitude.

When the driving current $i_m$ repeatedly increases and decreases with respect to a specific magnitude, the polarity of the sensing current $i_s$ may vary. For example, the sensing current $i_s$ may have a positive polarity while having the same magnitude as the driving current $i_m$ for the first period of time T1 and may have a negative polarity opposite to that of the driving current $i_m$ while having the same absolute value as the driving current $i_m$ for the second period of time T2.

The controller 140 may sample the sensing current $i_s$ at one time point A in the first time T1 and may sample the sensing current $i_s$ at one time point B in the second time T2. In this case, if the driving device 100 normally operates, the polarity of the sensing current at the time point A in the first time T1 may be different from that of the sensing current at the time point B in the second time T2.

The sensing current $i_s$ for the first period of time T1 may have the same absolute value and polarity as the driving current $i_m$, and the sensing current $i_s$ for the second period of time T2 may have the same absolute value as, but a different polarity from, the driving current $i_m$.

The controller 140 may determine that there is an abnormality in the H-bridge circuit 110 when a characteristic that is different from that of the sensing current $i_s$ observed in the normal operating state of the H-bridge circuit 110 is sensed as described above. In a different aspect, the controller 140 may determine that the H-bridge circuit 110 normally operates when a characteristic the same as that of the sensing current $i_s$ observed in the normal operating state of the H-bridge circuit 110 is sensed.

For example, when the polarity of a first sensing signal sensed at the time point A is different from that of a first normal signal (e.g., the positive polarity illustrated in FIG. 3), or when the polarity of a second sensing signal sensed at the time point B is different from that of a second normal signal (e.g., the negative polarity illustrated in FIG. 3), the controller 140 may determine that there is an abnormality in the H-bridge circuit 110. In a different aspect, when the polarity of the first sensing signal sensed at the time point A is the same as that of the first normal signal (e.g., the positive polarity illustrated in FIG. 3), or when the polarity of the second sensing signal sensed at the time point B is the same as that of the second normal signal (e.g., the negative polarity illustrated in FIG. 3), the controller 140 may determine that the H-bridge circuit 110 normally operates.

In another example, when the magnitude of the first sensing signal sensed at the time point A is beyond the range of the first normal signal (e.g., a specific range with respect to 10 A illustrated in FIG. 3), or when the magnitude of the second sensing signal sensed at the time point B is beyond the range of the second normal signal (e.g., a specific range with respect to −10 A illustrated in FIG. 3), the controller 140 may determine that there is an abnormality in the H-bridge circuit 110. In a different aspect, when the magnitude of the first sensing signal sensed at the time point A is in the range of the first normal signal (e.g., a specific range with respect to 10 A illustrated in FIG. 3), or when the magnitude of the second sensing signal sensed at the time point B is in the range of the second normal signal (e.g., a specific range with respect to −10 A illustrated in FIG. 3), the controller 140 may determine that the H-bridge circuit 110 normally operates.

In yet another example, when the polarity of the first sensing signal sensed at the time point A and the polarity of the second sensing signal sensed at the time point B are the same as each other, the controller 140 may determine that there is an abnormality in the H-bridge circuit 110. In a different aspect, when the polarity of the first sensing signal sensed at the time point A and the polarity of the second sensing signal sensed at the time point B differ from each other, the controller 140 may determine that the H-bridge circuit 110 normally operates.

Figure 4:
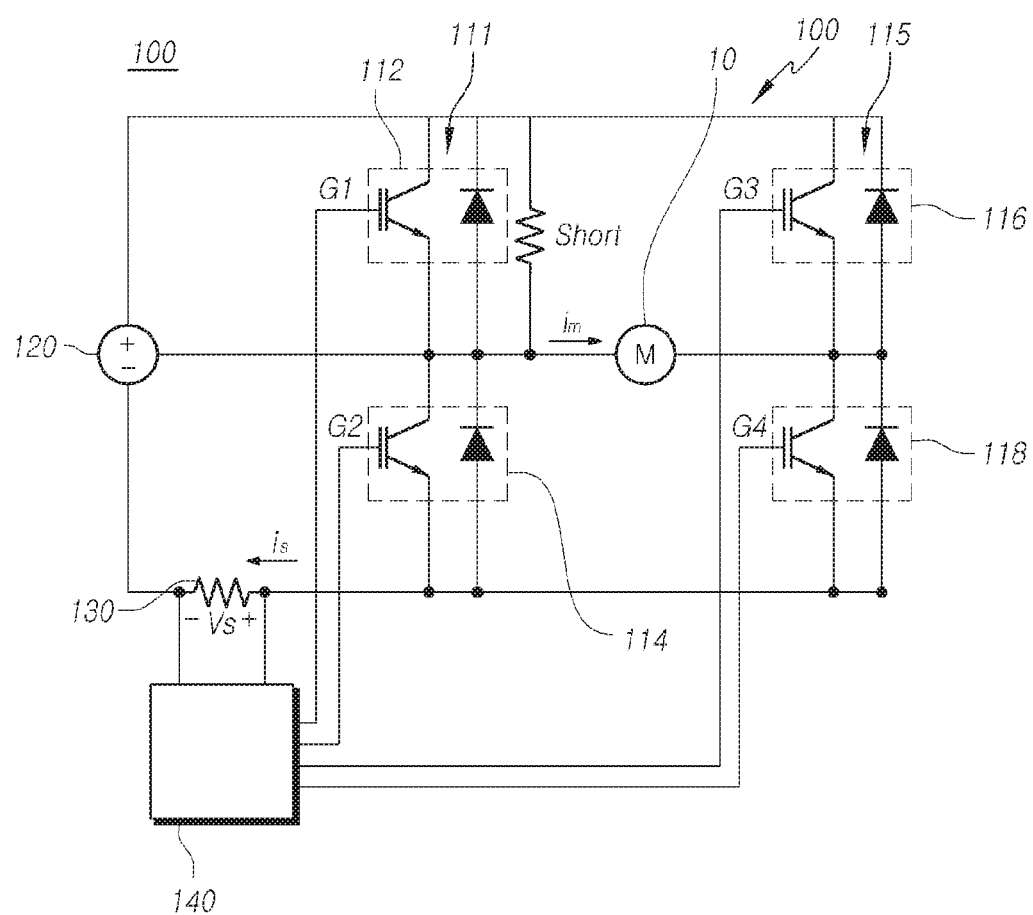
FIG. 4 illustrates the configuration of one embodiment of a motor driving device that abnormally operates.

FIG. 4 illustrates the configuration of one embodiment of a motor driving device that abnormally operates.

The motor driving device may break down in various forms. The representative example of the breakdown may be the short circuit or open of the switches 112, 114, 116, and 118. FIG. 4 illustrates a case where the first switch 112 has a short circuit. When a short circuit occurs in the first switch 112, as illustrated in FIG. 4, an effect may be obtained in which a resistor is connected with a power semiconductor in parallel. In this case, the magnitude of the resistor may be very small.

When the switches 112, 114, 116, and 118 have a short circuit, the turn-on and turn-off of the switches 112, 114, 116, and 118 are not controlled by gate signals. Accordingly, a large current may be caused in the switches that have a short circuit.

Figure 5:
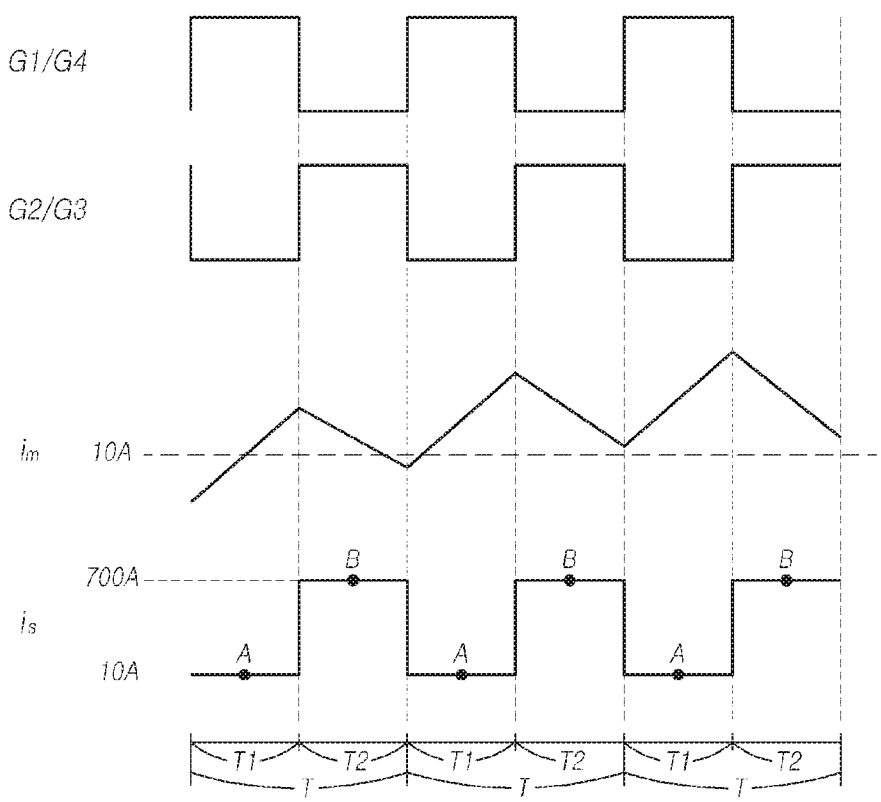
FIG. 5 illustrates waveforms generated in the driving device in an abnormal operating state similar to that illustrated in FIG. 4.

FIG. 5 illustrates waveforms generated in the driving device in an abnormal operating state similar to that illustrated in FIG. 4.

When normal gate signals G1, G2, G3, and G4 are supplied to the switches 112, 114, 116, and 118 while a short circuit occurs in the first switch 112 as illustrated in FIG. 4, the first switch 112 is not controlled by the gate signal G1, but the remaining switches 114, 116, and 118 are normally turned on or off by the gate signals G2, G3, and G4.

Referring to FIG. 5, during the first period T1, turn-on gate signals are supplied to the first switch 112 and the fourth switch 118, and turn-off gate signals are supplied to the second switch 114 and the third switch 116. In this case, the driving device 100 identically operates as in a normal operating state since the first switch 112 is not controlled by the first gate signal G1, but has a short circuit.

In contrast, during the second period T2, turn-off gate signals are supplied to the first switch 112 and the fourth switch 118, and turn-on gate signals are supplied to the second switch 114 and the third switch 116. In this case, the first switch 112 is not controlled by the first gate signal G1 and is continually maintained in the short circuit state, and a large current flows in the first leg 111 since the second switch 114 located in the first leg 111 is turned on.

The controller 140 may sense a sensing current $i_s$ one or more times for the first period of time T1 and for the second period of time T2 within the PWM period (T) to detect an abnormal operation of the driving device 100.

For example, when the polarity of a first sensing signal sensed at the time point A differs from that of a first normal signal, or when the polarity of a second sensing signal sensed at the time point B differs from that of a second normal signal (e.g., when the second sensing signal has a positive polarity rather than a negative polarity that is a normal signal polarity as illustrated in FIG. 5), the controller 140 may determine that there is an abnormality in the H-bridge circuit 110. In a different aspect, when the polarity of the first sensing signal sensed at the time point A is the same as that of the first normal signal, and when the polarity of the second sensing signal sensed at the time point B is the same as that of the second normal signal, the controller 140 may determine that the H-bridge circuit 110 normally operates.

In another example, when the magnitude of the first sensing signal sensed at the time point A is beyond the range of the first normal signal, or when the magnitude of the second sensing signal sensed at the time point B is beyond the range of the second normal signal (e.g., when the second sensing signal is beyond a specific range with respect to −10 A as illustrated in FIG. 5), the controller 140 may determine that there is an abnormality in the H-bridge circuit 110. In a different aspect, when the magnitude of the first sensing signal sensed at the time point A is in the range of the first normal signal and when the magnitude of the second sensing signal sensed at the time point B is in the range of the second normal signal, the controller 140 may determine that the H-bridge circuit 110 normally operates.

In yet another example, when the polarity of the first sensing signal sensed at the time point A and the polarity of the second sensing signal sensed at the time point B are the same as each other (e.g., when the first and second sensing signals all have a positive polarity as illustrated in FIG. 5), the controller 140 may determine that there is an abnormality in the H-bridge circuit 110. In a different aspect, when the polarity of the first sensing signal sensed at the time point A and the polarity of the second sensing signal sensed at the time point B differ from each other, the controller 140 may determine that the H-bridge circuit 110 normally operates.

Figure 6:
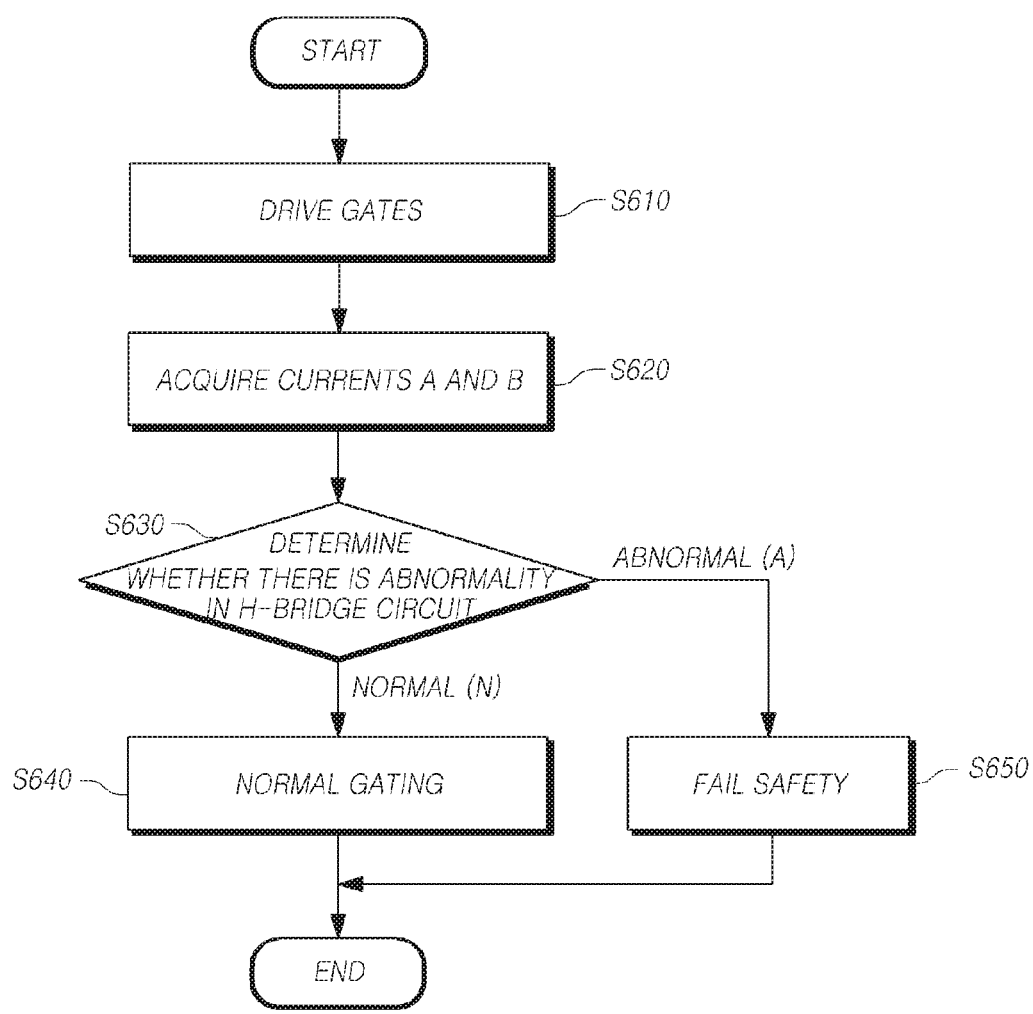
FIG. 6 is a flowchart illustrating a method of controlling a driving device according to one embodiment.

FIG. 6 is a flowchart illustrating a method of controlling a driving device according to one embodiment.

Referring to FIG. 6, the driving device 100 may supply turn-on gate signals to the first switch 112 disposed in the first leg 111 of the H-bridge circuit 110 and the fourth switch 118 disposed in the second leg 115 for the first period of time T1, and may supply turn-on gate signals to the second switch 114 disposed in the first leg 111 and the third switch 116 disposed in the second leg 115 for the second period of time T2 (Step S610).

The driving device 100 may sample the sensing voltage $V_s$ formed in the shunt resistor $r_s$ disposed between the H-bridge circuit 110 and the voltage source 120 one or more times for the first period of time T1 and for the second period of time T2 (Step S620).

The driving device 100 determines whether there is an abnormality in the H-bridge circuit 110 according to the characteristic of the first sensing signal sampled for the first period of time T1 and the characteristic of the second sensing signal sampled for the second period of time T2 (Step S630), and when it is determined that there is an abnormality in the H-bridge circuit 110 (Step S630-A), the driving device 100 supplies gate signals according to a fail safety algorithm to the respective switches (Step S650). In this case, when it is determined that the H-bridge circuit 110 normally operates (Step S630-N), the driving device 100 supplies normal gate signals to the respective switches (Step S640).

In the step of determining whether there is an abnormality in the H-bridge circuit 110 (Step S630), when the polarity of the first sensing signal differs from that of the first normal signal, or when the polarity of the second sensing signal differs from that of the second normal signal, the driving device 100 may determine that there is an abnormality in the H-bridge circuit 110.

In the step of determining whether there is an abnormality in the H-bridge circuit 110 (Step S630), when the magnitude of the first sensing signal is beyond the range of the first normal signal, or when the magnitude of the second sensing signal is beyond the range of the second normal signal, the driving device 100 may determine that there is an abnormality in the H-bridge circuit 110.

In the step of determining whether there is an abnormality in the H-bridge circuit 110 (Step S630), when the first and second sensing signals have different polarities, the driving device 100 may determine that the H-bridge circuit 110 normally operates.

In the step of determining whether there is an abnormality in the H-bridge circuit 110 (Step S630), when the magnitudes of the first and second sensing signals are in a normal signal range, the driving device 100 may determine that the H-bridge circuit 110 normally operates.

Meanwhile, the step of performing the fail safety algorithm (Step S650), the driving device 100 may transmit turn-off gate signals to the switches 112, 114, 116, and 118 to stop the operation of the H-bridge circuit 110.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present invention expressly defines them so.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A motor driving device comprising:
an H-bridge circuit that comprises first and second legs, each of which has one pair of switches disposed therein and connected with each other in series, and is configured to supply a driving current to a motor;
a current sensor disposed between the H-bridge circuit and a voltage source; and
a controller configured to acquire a first sensing signal from the current sensor for a first period of time during which a turn-on signal is supplied to the first switch disposed in the first leg or the fourth switch disposed in the second leg, to acquire a second sensing signal from the current sensor for a second period of time during which a turn-on signal is supplied to the second switch disposed in the first leg or the third switch disposed in the second leg, and to determine whether there is an abnormality in the H-bridge circuit according to the characteristic of at least one of the first and second sensing signals.

2. The motor driving device of claim 1, wherein the controller is configured to determine that there is an abnormality in the H-bridge circuit when the polarity of the first sensing signal differs from that of a first normal signal, or when the polarity of the second sensing signal differs from that of a second normal signal.

3. The motor driving device of claim 1, wherein the controller is configured to determine that there is an abnormality in the H-bridge circuit when the magnitude of the first sensing signal is beyond the range of a first normal signal, or when the magnitude of the second sensing signal is beyond the range of a second normal signal.

4. The motor driving device of claim 1, wherein the controller is configured to determine that the H-bridge circuit normally operates when the first and second sensing signals have different polarities.

5. The motor driving device of claim 1, wherein the controller is configured to determine that the H-bridge circuit normally operates when the magnitudes of the first and second sensing signals are in the range of a normal signal.

6. The motor driving device of claim 1, wherein the controller is configured to generate gate signals for controlling the turn-on and turn-off of the switches disposed in the H-bridge circuit and to transmit turn-off gate signals to the switches when it is determined that there is an abnormality in the H-bridge circuit.

7. The motor driving device of claim 1, wherein the current sensor is a shunt resistor, and the controller comprises:
a sensing block configured to sense the first and second sensing signals using a sample & hold circuit;
a determination block configured to determine whether there is an abnormality in the H-bridge circuit according to the characteristics of the first and second sensing signals; and
a gate driving block configured to control the turn-on and turn-off of the switches disposed in the H-bridge circuit according to the determination result as to whether there is an abnormality in the H-bridge circuit.

8. A method for driving a motor using an H-bridge circuit, comprising:
a gate driving step of supplying turn-on gate signals to a first switch disposed in a first leg of the H-bridge circuit and a fourth switch disposed in a second leg for a first period of time and supplying turn-on gate signals to a second switch disposed in the first leg and a third switch disposed in the second leg for a second period of time;
a current sensing step of sampling the sensing voltage formed in a shunt resistor disposed between the H-bridge circuit and a voltage source one or more times for the first period of time and for the second period of time;
a normality determination step of determining whether there is an abnormality in the H-bridge circuit according to the characteristic of at least one of a first sensing signal sampled for the first period of time and a second sensing signal sampled for the second period of time; and
a fail safety step of supplying gate signals according to the fail safety algorithm to the respective switches when it is determined that there is an abnormality in the H-bridge circuit.

9. The method of claim 8, wherein in the normality determination step, it is determined that there is an abnormality in the H-bridge circuit when the polarity of the first sensing signal differs from that of a first normal signal, or when the polarity of the second sensing signal differs from that of a second normal signal.

10. The method of claim 8, wherein in the normality determination step, it is determined that there is an abnormality in the H-bridge circuit when the magnitude of the first sensing signal is beyond the range of a first normal signal, or when the magnitude of the second sensing signal is beyond the range of a second normal signal.

11. The method of claim 8, wherein in the normality determination step, it is determined that the H-bridge circuit normally operates when the first and second sensing signals have different polarities.

12. The method of claim 8, wherein in the normality determination step, it is determined that the H-bridge circuit normally operates when the magnitudes of the first and second sensing signals are in the range of a normal signal.

* * * * *